(12) United States Patent
Wang (10) Patent No.: US 6,469,871 B1
(45) Date of Patent: Oct. 22, 2002

(54) DISK DRIVE COMPRISING A BISTABLE LATCH WITH BI-LEVEL GROOVES AND A SPRING RESTRAINING FORCE

(75) Inventor: David T. W. Wang, Sunnyvale, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 148 days.

(21) Appl. No.: 09/773,967

(22) Filed: Jan. 31, 2001

(51) Int. Cl.$^7$ ............................................. G11B 21/22
(52) U.S. Cl. ................................................ 360/256.4
(58) Field of Search ........................... 360/256.1–256.9

(56) References Cited

U.S. PATENT DOCUMENTS

| | | |
|---|---|---|
| 5,303,101 A | 4/1994 | Hatch et al. |
| 5,636,090 A | 6/1997 | Boigenzahn et al. |
| 5,717,548 A | 2/1998 | Koester et al. |
| 6,088,193 A * | 7/2000 | Misso et al. .............. 360/256.2 |
| 6,134,077 A * | 10/2000 | Misso et al. ................ 360/256 |
| 6,327,119 B1 * | 12/2001 | Barina et al. ............ 360/256.4 |
| 6,400,533 B1 * | 6/2002 | Liu et al. .................. 360/256.5 |

* cited by examiner

Primary Examiner—Allen Cao
(74) Attorney, Agent, or Firm—W. Chris Kim, Esq; Milad G Shara, Esq (57) ABSTRACT

A disk drive is disclosed comprising a bistable latch for latching an actuator arm in a latched position. The bistable latch comprises a latch base comprising a first groove and a second groove, wherein a depth of at least part of the first groove is different than a depth of at least part of the second groove. The bistable latch further comprises a latch arm movable with respect to the latch base, the latch arm comprising a guide member interacting with the first and second grooves for guiding the latch arm through a predetermined trajectory. The bistable latch further comprises a spring having a first end connected to the latch base and a second end connected to the latch arm.

16 Claims, 7 Drawing Sheets

FIG. 7

DISK DRIVE COMPRISING A BISTABLE LATCH WITH BI-LEVEL GROOVES AND A SPRING RESTRAINING FORCE

BACKGROUND OF THE INVENTION

1. Field of the Invention

The present invention relates to disk drives for computer systems. More particularly, the present invention relates to a disk drive comprising a bistable latch with bi-level grooves and a spring restraining force.

2. Description of the Prior Art

With disk drives a disk is rotated about a center axis and a head is actuated radially over the disk to write and read data in concentric data tracks. The rotation of the disk forms an air bearing upon which the head "flies" just above the surface of the disk. The head is coupled to a distal end of an actuator arm which is rotated about a pivot by a voice coil motor. When the disk spins down and the air bearing dissipates (e.g., when the disk drive is powered down), the actuator arm is rotated to move the head away from the data area of the disk to prevent damage to the recorded data as well as to the head. A passive latch mechanism is employed to prevent the actuator arm from rotating and moving the head onto the data area of the disk while the disk drive is powered down.

Prior art latch mechanisms include a magnet attached to a crash stop for latching to a metal tang protruding from a coil portion of a head stack assembly. These types of latches require a magnet of sufficient strength to restrain the actuator arm in the latched position when the disk drive is subjected to rotational shocks. However, when the actuator arm is unlatched during normal operation of the disk drive, a high force is needed to detach the tang from the magnet which can cause the actuator arm to vibrate. The vibration in the actuator arm can damage the head due to "head-slap" wherein the head physically contacts the surface of the disk or a ramp.

One known technique for reducing damage due to head-slap is to employ a weaker magnet together with an inertial latch. An inertial latch comprises an inertial arm which rotates and "catches" the actuator arm when the disk drive is subjected to a rotational shock. When the rotational shock subsides, the inertial arm releases the actuator arm and rotates back into a normal position. However, there are drawbacks associated with an inertial latch, namely they are expensive and unreliable depending on the nature of the rotational shock (e.g., magnitude and orientation).

There is, therefore, a need for a more reliable latching mechanism for use in a disk drive with sufficient restraining force to restrain an actuator arm when subjected to rotational shocks while minimizing vibrations and head-slap during a normal unlatch operation.

SUMMARY OF THE INVENTION

The present invention may be regarded as a disk drive comprising a disk drive base and a head stack assembly coupled to the disk drive base, the head stack assembly comprising a tang, an actuator arm, and a head coupled to the actuator arm. The disk drive further comprises a bistable latch for latching the actuator arm in a latched position. The bistable latch comprises a latch base supported by the disk drive base, the latch base comprising a first groove and a second groove, wherein a depth of at least part of the first groove is different than a depth of at least part of the second groove. The bistable latch further comprises a latch arm movable with respect to the latch base, the latch arm comprising a contact surface for contacting the tang and a guide member interacting with the first and second grooves for guiding the latch arm through a predetermined trajectory. A spring comprising a first end and a second end is employed by the bistable latch, wherein the first end of the spring is connected to the latch base, and the second end connected to the latch arm. The guide member interacts with the first groove when latching the actuator arm, and the guide member interacts with the second groove when unlatching the actuator arm.

In one embodiment, each of the first and second grooves comprise a first and second end, and the first and second grooves are connected at both the first and second ends. In another embodiment, the first groove comprises a depression, and the guide member of the latch arm interacts with the depression when the actuator arm is in the latched position. In still another embodiment, the disk drive further comprises an actuator for applying a force to the actuator arm to latch and unlatch the actuator arm. The contact surface of the latch arm contacts the tang while the actuator applies the force to the actuator arm. The latch arm further comprises a restraining surface for contacting the tang when the force applied by the actuator is removed. The contact surface and restraining surface are integrally formed, and the contact surface and restraining surface rotate about a pivot in order to place the restraining surface in a position to contact the tang when latching the actuator arm. In yet another embodiment, the disk drive further comprises a ramp for parking the head during a non-operating mode.

The present invention may also be regarded as a disk drive comprising a disk drive base and a head stack assembly coupled to the disk drive base, the head stack assembly comprising a tang, an actuator arm, and a head coupled to the actuator arm. The disk drive further comprises a bistable latch for latching the actuator arm in a latched position. The bistable latch comprises a latch base supported by the disk drive base, the latch base comprising a guide member. The bistable latch further comprises a latch arm movable with respect to the latch base, the latch arm comprising a contact surface for contacting the tang, and a first groove and a second groove for interacting with the guide member of the latch base for guiding the latch arm through a predetermined trajectory, wherein a depth of at least part of the first groove is different than a depth of at least part of the second groove. A spring comprising a first end and a second end is employed by the bistable latch, wherein the first end of the spring is connected to the latch base, and the second end connected to the latch arm. The guide member interacts with the first groove when latching the actuator arm, and the guide member interacts with the second groove when unlatching the actuator arm.

DESCRIPTION OF THE PREFERRED EMBODIMENTS

Figure 1:
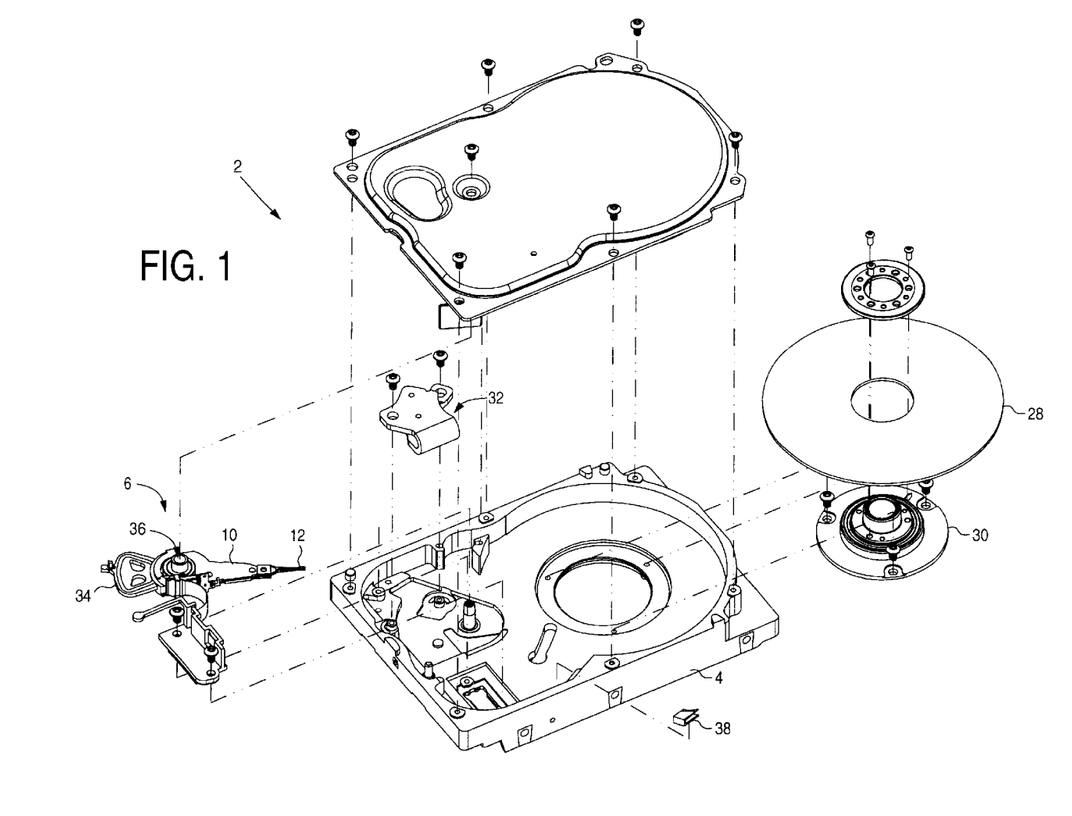
FIG. 1 is an exploded view of a disk drive employing a bistable latch comprising bi-level grooves according to an embodiment of the present invention.

FIG. 1 shows a disk drive 2 according to an embodiment of the present invention as comprising a disk drive base 4 and a head stack assembly 6 coupled to the disk drive base 4, the head stack assembly 6 comprising a tang 8 (FIG. 2), an actuator arm 10, and a head 12 coupled to the actuator arm 10. The disk drive 2 further comprises a bistable latch 14 (FIG. 2) for latching the actuator arm 10 in a latched position. The bistable latch 14 comprises a latch base 16 supported by the disk drive base 4, the latch base 16 comprising a first groove (18A, 18B, 18C) and a second groove (19A, 19B), wherein a depth of at least part of the first groove (18A, 18B, 18C) is different than a depth of at least part of the second groove (19A, 19B). The bistable latch 14 further comprises a latch arm 20 movable with respect to the latch base 16, the latch arm 20 comprising a contact surface 22 for contacting the tang 8 and a guide member 24 interacting with the first and second grooves (18A, 18B, 18C) and (19A, 19B) for guiding the latch arm 20 through a predetermined trajectory. A spring 26 (FIG. 5) comprising a first end and a second end is employed by the bistable latch, wherein the first end of the spring is connected to the latch base 16, and the second end connected to the latch arm 20. The guide member 24 interacts with the first groove (18A, 18B, 18C) when latching the actuator arm 10, and the guide member 24 interacts with the second groove (19A, 19B) when unlatching the actuator arm 10.

The disk drive 2 of FIG. 1 further comprises a rigid disk 28 (e.g., a magnetic disk) clamped to the hub of a spindle motor 30 which rotates the disk 28 about it's axis. A voice coil motor 32 interacts with a voice coil 34 attached to the end of the actuator arm 10 in order to rotate the actuator arm 10 about a pivot 36 to position the head 12 radially over the disk 28. When the disk 28 spins down (e.g., when the disk drive 2 is powered down), the voice coil motor 32 rotates the actuator arm 10 to move the head 12 away from the data area of the disk 28 to prevent damage to the recorded data as well as to the head 12. The actuator arm 10 is then latched by the bistable latch 14 of FIG. 2 to restrain the actuator arm 10 in its latched position. In the embodiment of FIG. 1, the disk drive 2 comprises a ramp 38 at the periphery of the disk 28 for parking the head 12 when the actuator arm 10 is moved into the latched position. In an alternative embodiment, the head 12 is parked on a landing zone at the inner diameter of the disk 28.

Figure 2:
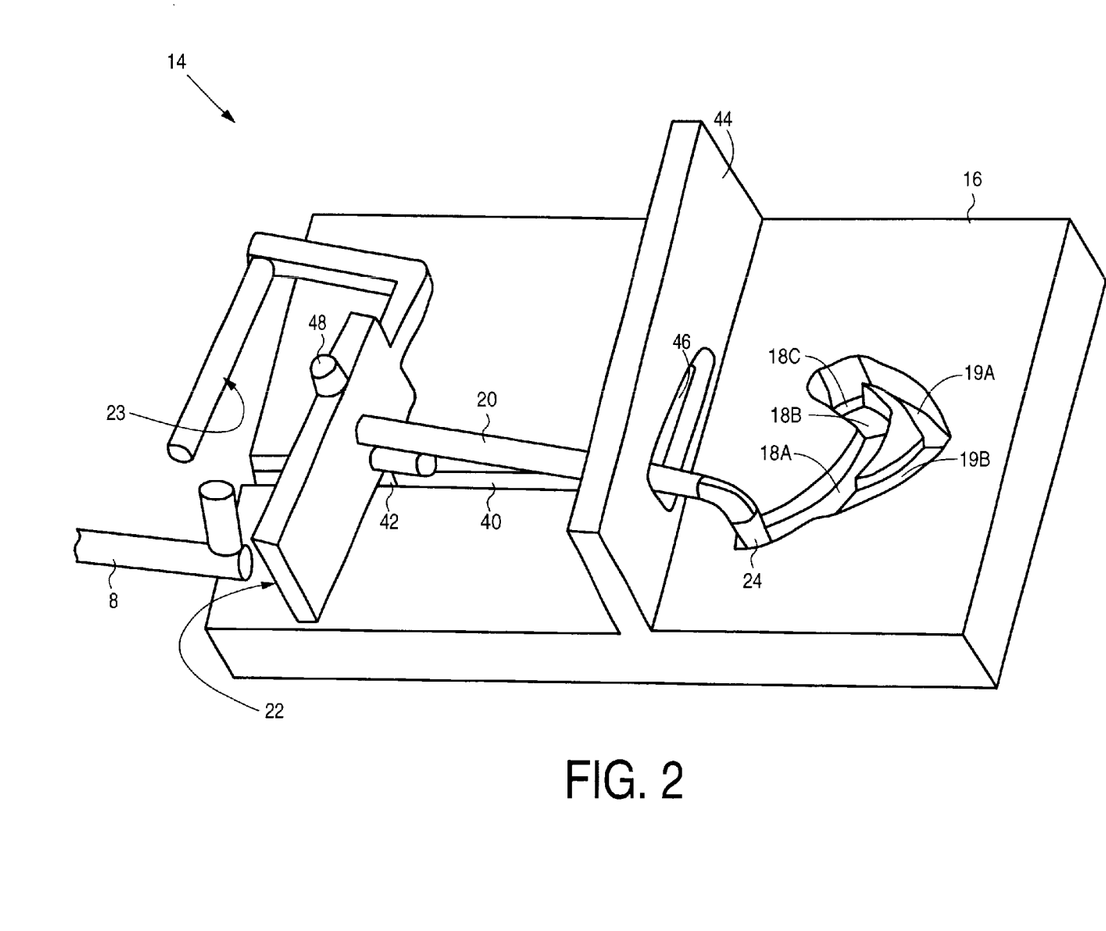
FIG. 2 is a perspective view of the bistable latch for use in the disk drive of FIG. 1 according to an embodiment of the present invention, the bistable latch comprising a latch arm movable with respect to a latch base having bi-level grooves, wherein the latch arm comprises a guide member for interacting with the bi-level grooves.
Figure 3A:
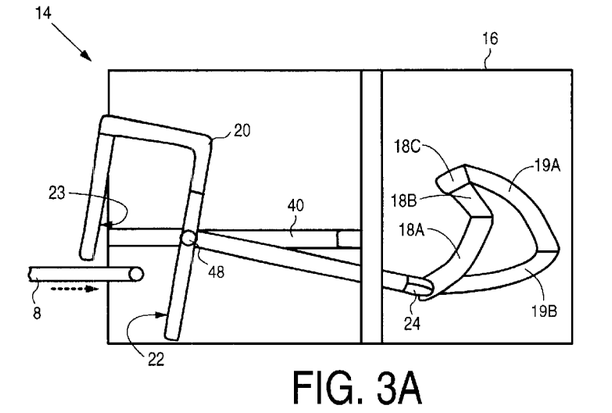
FIGS. 3A–3C illustrate the operation of the bistable latch of FIG. 2 while latching the actuator arm.
Figure 3B:
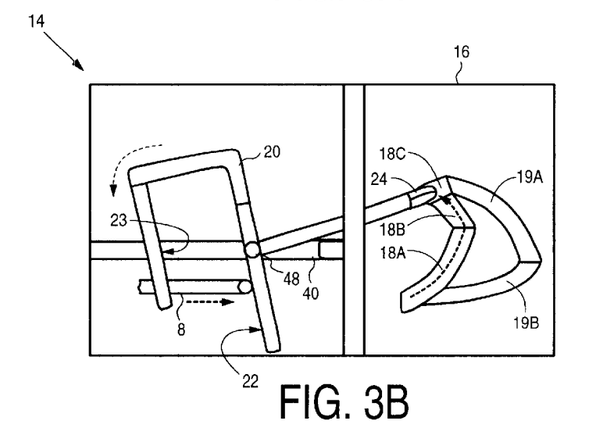
Figure 3C:
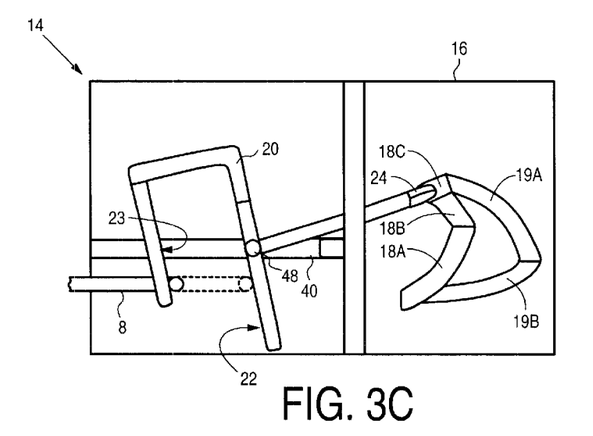

FIGS. 3A–3C illustrate the operation of the bistable latch 14 of FIG. 2 while latching the actuator arm 10 when the disk spins down. As shown in FIG. 3A, the actuator arm 10 is rotated so as to move the tang 8 toward the contact surface 22 of the latch arm 20. The tang 8 is positioned on the head stack assembly 6 at any suitable location, including on the voice coil 34 or along the length of the actuator arm 10. When the tang 8 touches the contact surface 22 of the latch arm 20, the actuator arm 10 is further rotated in order to push the tang 8 against the contact surface 22 thereby moving the latch arm 20 along an axial groove 40 formed in the latch base 16. As shown in FIG. 2, the latch arm 20 comprises a protruding member 42 inserted into the axial groove 40 to facilitate guiding the latch arm 20 along the axial groove 40. As shown in FIG. 3B, as the tang 8 pushes the latch arm 20, the guide member 24 at the end of the latch arm 20 interacts with the first groove (18A, 18B, 18C) in order to guide the latch arm 20 through a predetermined trajectory.

In the embodiment of FIG. 2, the first groove comprises a relatively flat segment 18A, a ramp segment 18B, and a depression 18C. When the guide member 24 reaches the ramp segment 18B, the voice coil motor 32 reverses the force applied to the actuator arm 10 to move the tang 8 away from the contact surface 22. The bias force from the spring 26 (FIG. 5) then pushes the guide member 24 down the ramp segment 18B and into the depression 18C. The transition between the first segment 18A and the ramp segment 18B is positioned above the axial groove 40 so that when the guide member 24 reaches the ramp segment 18B the latch arm 20 will be biased toward the ramp segment 18B rather than toward the first segment 18A. In the embodiment of FIG. 2, the latch base 16 further comprises a vertical wall 44 with an aperture 46 through which the latch arm 20 is inserted. The width of the aperture 46 decreases near the end of the latch arm's trajectory so as to bias the guide member 24 into the depression 18C.

Figure 5:
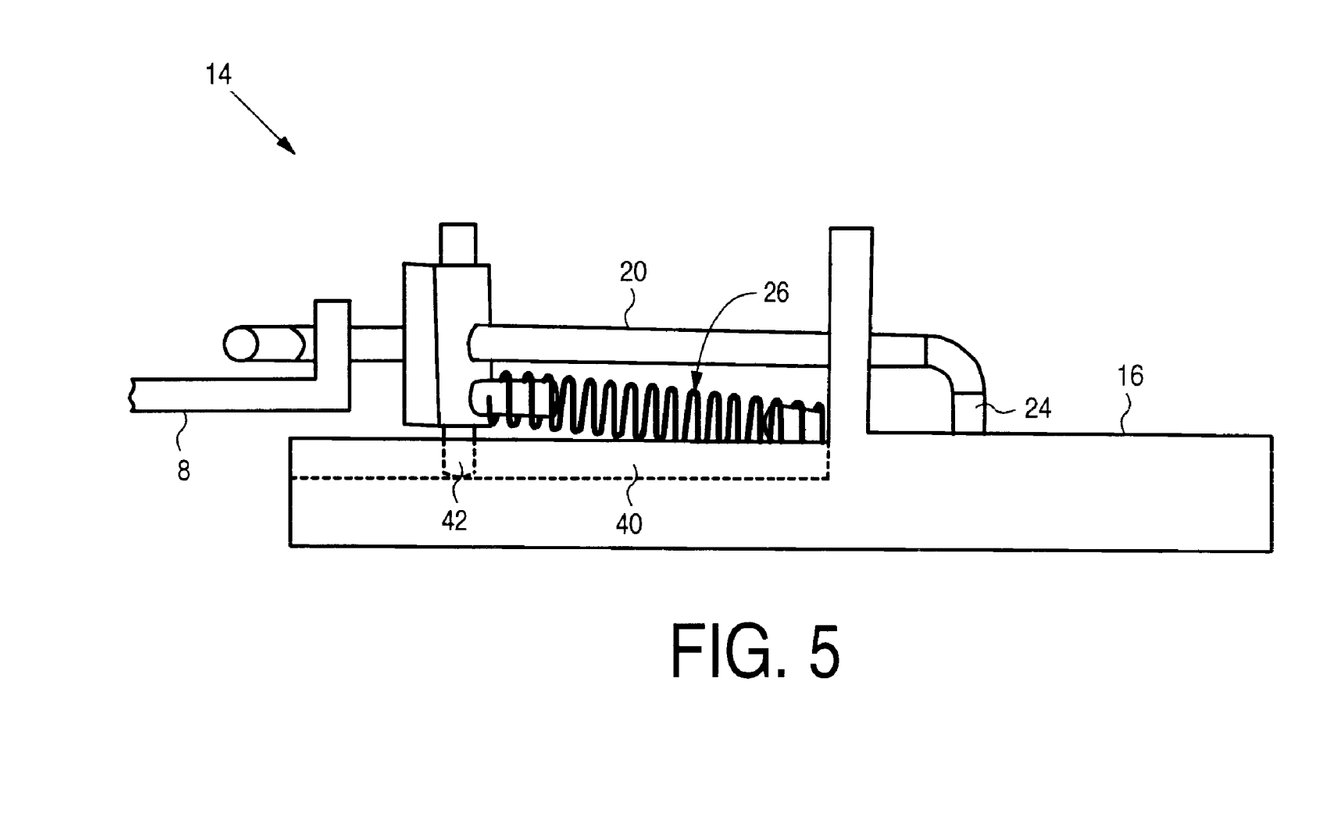
FIG. 5 shows a side view of the bistable latch of FIG. 2, including a spring having a first end attached to a latch arm and a second end attached to a latch base according to one embodiment of the present invention.

The bias force from the spring 26 (FIG. 5) acts as a restraining force to restrain the guide member 24 of the latch arm 20 in the depression 18C of the first groove when the disk drive is powered down. As shown in FIG. 5, the spring 26 comprises a first end connected to the latch base 16, and a second end connected to the latch arm 20. The spring 26 generates a biasing force on the latch arm 20 which presses the guide member 24 against an interior wall of the first groove at the depression 18C.

Referring again to FIG. 2, the latch arm 20 comprises a restraining surface 23 which is integrally formed with the contact surface 22. Referring to FIG. 3B, as the tang 8 pushes against the contact surface 22 of the latch arm 20 to move the latch arm 20 along the axial groove 40, the contact surface 22 and restraining surface 23 rotate about a pivot 48 in order to place the restraining surface 23 in a position to contact the tang 8 when latching the actuator arm 20. When the actuator arm 20 is in the latched position as shown in FIG. 3C, the tang 8 remains confined within the space defined by the contact surface 22 and the restraining surface 23. The dashed lines indicate that the tang 8 may "float" between the contact surface 22 and the restraining surface 23 when the disk drive is powered down, while the bias force from the spring 26 retains the bistable latch 14 in the latched position. Restraining the tang 8 in this manner restrains the actuator arm 10 in the latched position even in the presence of physical shocks.

Figure 4A:
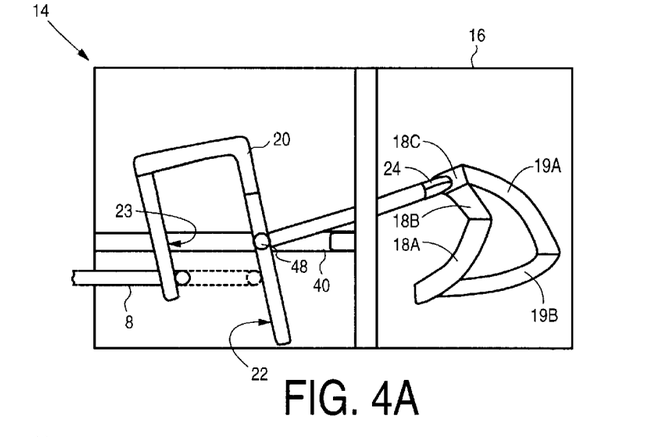
FIGS. 4A–4C illustrate the operation of the bistable latch of FIG. 2 while unlatching the actuator arm.
Figure 4B:
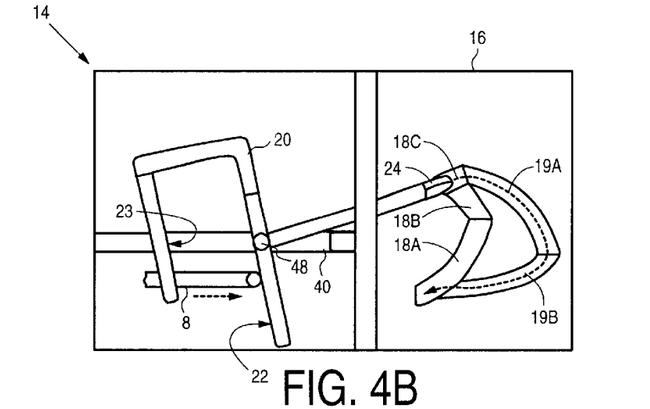
Figure 4C:
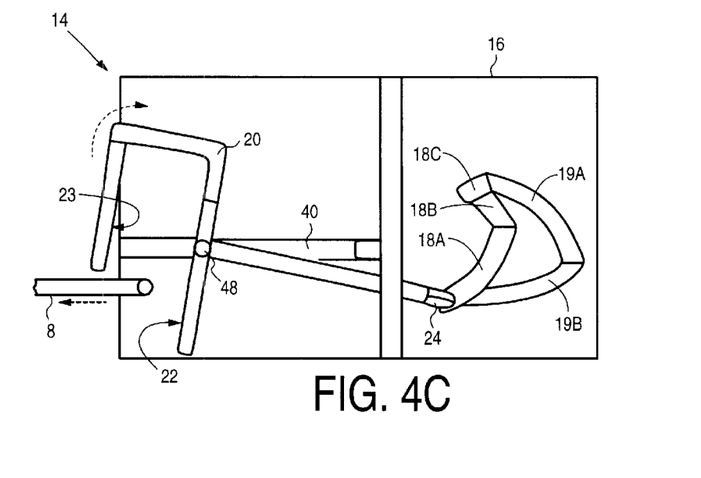

FIGS. 4A–4C illustrate the unlatch operation of the bistable latch 14 of FIG. 2 when the disk drive is powered on. FIG. 4A shows the state of the bistable latch 14 just before power-on wherein the tang 8 may be "floating" in the space between the contact surface 22 and the restraining surface 23. FIG. 4B shows the voice coil motor 32 applying a force to the actuator arm 10 (via the voice coil 34) in order to push the tang 8 against the contact surface 22 and move the latch arm 20 further along the axial groove 40. This causes the guide member 24 of the latch arm to follow segment 19A of the second groove. Segment 19A of the second groove is deeper than the ramp segment 18B of the first groove which causes the guide member 24 to traverse segment 19A of the second groove rather than traverse up the ramp segment 18B of the first groove during the unlatch operation. When the guide member 24 reaches segment 19B of the second groove, the voice coil motor 32 reverses the force applied to the actuator arm 10 so as to move the tang 8 away from the contact surface 22 and toward the restraining surface 23. The spring 26 (FIG. 5) generates a bias force which pushes the latch arm 20 back down the axial groove 40 toward the end of the bistable latch 14 so that the guide member 24 traverses segment 19B of the second groove. As shown in FIG. 4C, as the guide member 24 traverses segment 19B of the second groove, the contact surface 22 and restraining surface 23 rotate about pivot 48, thereby moving the restraining surface 23 away from the tang 8 and allowing the actuator arm 10 to unlatch. The transition between the first segment 19A and the second segment 19B is lower than the axial groove 40 so that when the guide member 24 reaches the second segment 19B the latch arm 20 is biased toward the second segment 19B rather than toward the first segment 19A.

Figure 6A:
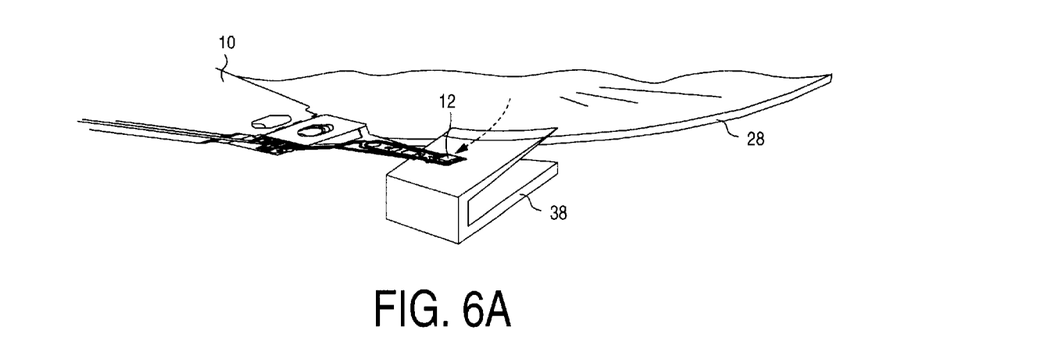
FIGS. 6A–6C illustrate the latch and unlatch operation of a disk drive employing ramp loading and unloading according to an embodiment of the present invention.
Figure 6B:
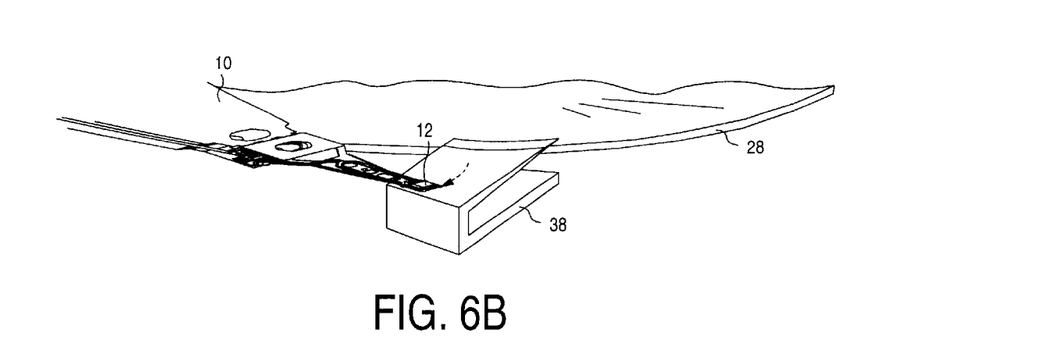
Figure 6C:
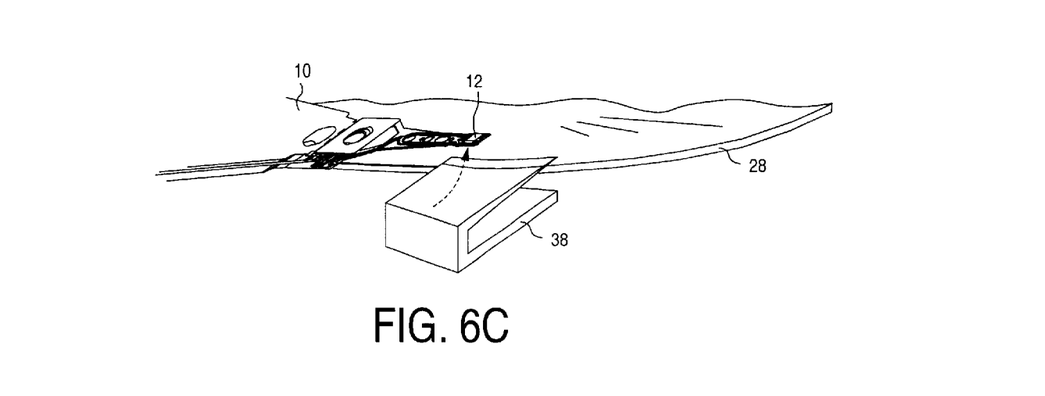

FIGS. 6A–6C further illustrate the latching and unlatching operations of the bistable latch 14 of FIG. 2 in the embodiment wherein the disk drive employs ramp loading and unloading. FIG. 6A illustrates an unload operation wherein the head 12 is moved onto a ramp 38. The ramp 38 comprises a first end proximate the disk 28, a ramp surface, and a second end, the ramp surface extending from the first end away from the disk 28 to the second end. The voice coil motor 32 applies a force to the actuator arm 10 to move the head 12 onto the first end of the ramp 38 and along the ramp surface toward the second end of the ramp 38 until the actuator arm 10 reaches the latched position (see FIGS. 3A–3B). When the disk drive is powered down, the actuator arm 10 is retained in the latched position by the bistable latch 14 (see FIG. 3C). When the disk drive is powered on, the actuator arm 10 is unlatched as shown in FIG. 6B by the voice coil motor 32 applying a force to the actuator arm 10 to move the head 12 further up the ramp surface towards the second end of the ramp 38 (see FIGS. 4A–4B). The voice coil motor 32 then reverses the force applied to the actuator arm 10 to move the head 12 down the ramp surface toward the first end of the ramp 38 and then off the ramp 38 onto the surface of the disk 28 (see FIG. 4C).

Figure 7:
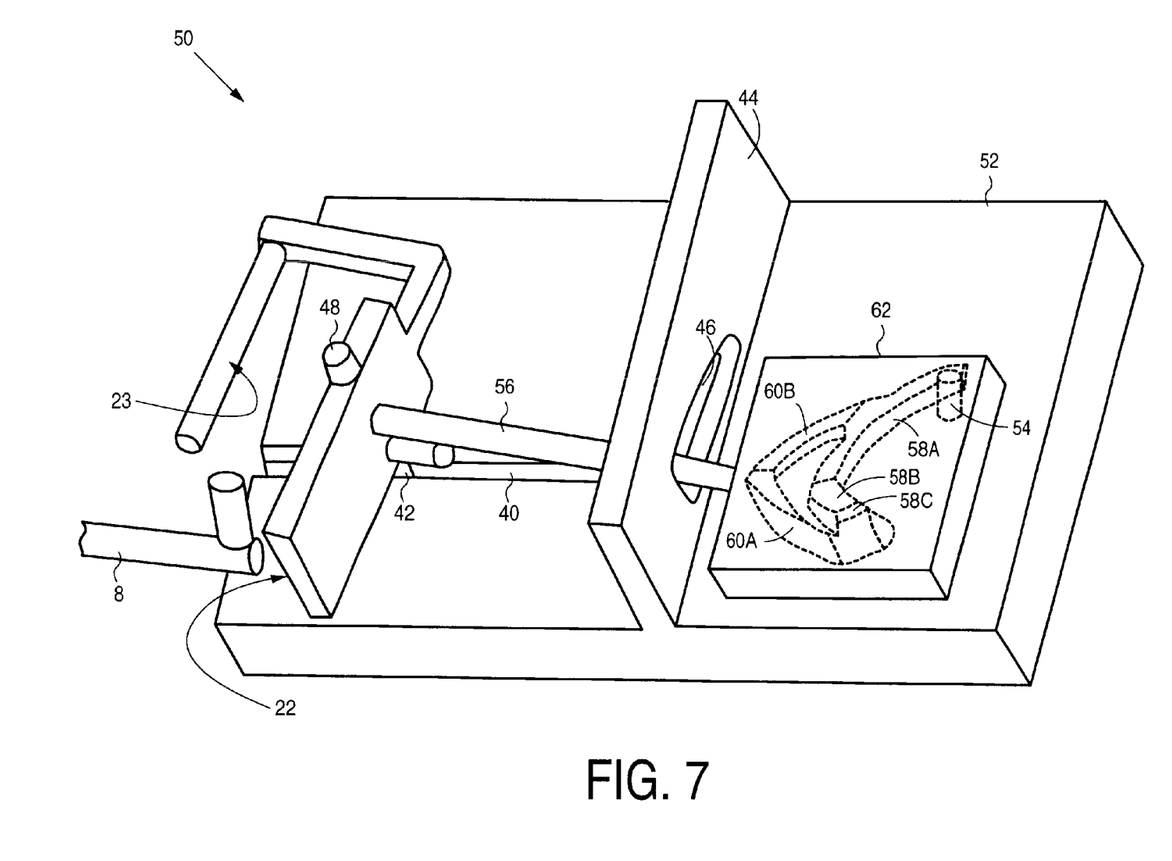
FIG. 7 shows a bistable latch according to an alternative embodiment of the present invention wherein the latch arm comprises the bi-level grooves and the latch base comprises a guide member for interacting with the bi-level grooves.

FIG. 7 shows a bistable latch 50 for use in the disk drive of FIG. 1 according to an alternative embodiment of the present invention. In this embodiment, the bistable latch 50 comprises a latch base 52 supported by the disk drive base 4, the latch base 52 comprising a guide member 54. The bistable latch 50 further comprises a latch arm 56 movable with respect to the latch base 52. The latch arm 56 comprises a contact surface 22 for contacting the tang 8, and a first groove (58A, 58B, 58C) and a second groove (60A, 60B) for interacting with the guide member 54 of the latch base 52 for guiding the latch arm 56 through a predetermined trajectory, wherein a depth of at least part of the first groove (58A, 58B, 58C) is different than a depth of at least part of the second groove (60A, 60B).

In the embodiment of FIG. 7, the first groove (58A, 58B, 58C) and the second groove (60A, 60B) are formed in a plate 62 attached to a distal end of the latch arm 56. The first and second grooves perform essentially the same function as the first and second grooves in the embodiment of FIG. 2. During a latching operation, the tang 8 pushes on the contact surface 22 of the latch arm 56 such that the guide member 54 of the latch base 52 follows segment 58A of the first groove, and the inclination of the aperture 46 biases the plate 62 downward such that the guide member 54 traverses the ramp section 58B of the groove landing in the depression 58C of the first groove. The contact surface 22 and restraining surface 23 rotate about pivot 48 to "capture" the tang 8, and the spring 26 (FIG. 5) provides a bias force to restrain the guide member 54 in the depression 58C.

During an unlatch operation, the tang 8 pushes against the contact surface 22 so that the guide member 54 follows segment 60A of the second groove. Segment 60A of the second groove is deeper than the ramp segment 58B of the first groove which causes the guide member 54 to traverse segment 60A of the second groove rather than traverse up the ramp segment 58B of the first groove during the unlatch operation. When the guide member 54 reaches segment 60B of the second groove, the voice coil motor 32 reverses the force applied to the actuator arm 10 so as to move the tang 8 away from the contact surface 22 and toward the restraining surface 23. The spring 26 (FIG. 5) generates a bias force which pushes the latch arm 56 back down the axial groove 40 toward the end of the bistable latch 50 so that the guide member 54 traverses the second segment 60B. As the guide member 54 traverses segment 60B of the second groove, the contact surface 22 and restraining surface 23 rotate about pivot 48, thereby moving the restraining surface 23 away from the tang 8 and allowing the actuator arm 10 to unlatch.

I claim:

1. A disk drive comprising:

a disk drive base;

a head stack assembly coupled to the disk drive base, the head stack assembly comprising:
   a tang;
   an actuator arm; and
   a head coupled to the actuator arm; and a bistable latch for latching the actuator arm in a latched position, the bistable latch comprising:
   (a) a latch base supported by the disk drive base, the latch base comprising a first groove and a second groove, wherein a depth of at least part of the first groove is different than a depth of at least part of the second groove;
   (b) a latch arm movable with respect to the latch base, the latch arm comprising:
   a contact surface for contacting the tang; and
   a guide member interacting with the first and second grooves for guiding the latch arm through a predetermined trajectory; and
   (c) a spring comprising a first end and a second end, the first end connected to the latch base, and the second end connected to the latch arm, wherein:
   the guide member interacts with the first groove when latching the actuator arm; and
   the guide member interacts with the second groove when unlatching the actuator arm.

2. The disk drive as recited in claim 1, wherein:
   (a) each of the first and second grooves comprise a first and second end; and
   the first and second grooves are connected, at least, at the first ends.

3. The disk drive as recited in claim 1, wherein:
   (a) each of the first and second grooves comprise a first and second end; and
   (b) the first and second grooves are connected at both the first and second ends.

4. The disk drive as recited in claim 1, wherein:
(a) the first groove comprises a depression; and
(b) the guide member of the latch arm interacts with the depression when the actuator arm is in the latched position.

5. The disk drive as recited in claim 1, wherein the disk drive further comprises an actuator for applying a force to the actuator arm to latch and unlatch the actuator arm, wherein:
(a) the contact surface of the latch arm for contacting the tang while the actuator applies the force to the actuator arm;
(b) the latch arm further comprises a restraining surface for contacting the tang when the force applied by the actuator is removed;
(c) the contact surface and restraining surface are integrally formed; and
(d) the contact surface and restraining surface rotate about a pivot in order to place the restraining surface in a position to contact the tang when latching the actuator arm.

6. The disk drive as recited in claim 1, wherein the spring for generating a restraining force for restraining the guiding member of the latch arm in the first groove of the latch base when the disk drive is powered down.

7. The disk drive as recited in claim 1, further comprising a ramp for parking the head during a non-operating mode.

8. The disk drive as recited in claim 7, wherein:
(a) the ramp comprises a first end proximate the disk, a ramp surface, and a second end, the ramp surface extending from the first end away from the disk to the second end;
(b) the disk drive further comprises an actuator for applying a force to the actuator arm to move the head onto the first end of the ramp and along the ramp surface toward the second end of the ramp until the actuator arm reaches the latched position and
(c) the actuator for applying a force to the actuator arm to move the head further up the ramp surface towards the second end of the ramp in order to unlatch the actuator arm.

9. A disk drive comprising:
a disk drive base;
a head stack assembly coupled to the disk drive base, the head stack assembly comprising:
a tang;
an actuator arm; and
a head coupled to the actuator arm; and
a bistable latch for latching the actuator arm in a latched position, the bistable latch comprising:
(a) a latch base supported by the disk drive base, the latch base comprising a guide member;
(b) a latch arm movable with respect to the latch base, the latch arm comprising:
a contact surface for contacting the tang; and
a first groove and a second groove for interacting with the guide member of the latch base for guiding the latch arm through a predetermined trajectory, wherein a depth of at least part of the first groove is different than a depth of at least part of the second groove; and
(c) a spring comprising a first end and a second end, the first end connected to the latch base, and the second end connected to the latch arm,
wherein:
the guide member interacts with the first groove when latching the actuator arm; and
the guide member interacts with the second groove when unlatching the actuator arm.

10. The disk drive as recited in claim 9, wherein:
(a) each of the first and second grooves comprise a first and second end; and
(b) the first and second grooves are connected, at least, at the first ends.

11. The disk drive as recited in claim 9, wherein:
(a) each of the first and second grooves comprise a first and second end; and
(b) the first and second grooves are connected at both the first and second ends.

12. The disk drive as recited in claim 9, wherein:
(a) the first groove comprises a depression; and
(b) the guide member of the latch base interacts with the depression when the actuator arm is in the latched position.

13. The disk drive as recited in claim 9, further comprising an actuator for applying a force to the actuator arm to latch and unlatch the actuator arm, wherein:
(a) the contact surface of the latch arm for contacting the tang while the actuator applies the force to the actuator arm;
(b) the latch arm further comprises a restraining surface for contacting the tang when the force applied by the actuator is removed;
(c) the contact surface and restraining surface are integrally formed; and
(d) the contact surface and restraining surface rotate about a pivot in order to place the restraining surface in a position to contact the tang when latching the actuator arm.

14. The disk drive as recited in claim 8, wherein the spring for generating a restraining force for restraining the guiding member of the latch base in the first groove of the latch arm when the disk drive is powered down.

15. The disk drive as recited in claim 9, further comprising a ramp for parking the head during a non-operating mode.

16. The disk drive as recited in claim 15, wherein:
(a) the ramp comprises a first end proximate the disk, a ramp surface, and a second end, the ramp surface extending from the first end away from the disk to the second end;
(b) the disk drive further comprises an actuator for applying a force to the actuator arm to move the head onto the first end of the ramp and along the ramp surface toward the second end of the ramp until the actuator arm reaches the latched position; and
(c) the actuator for applying a force to the actuator arm to move the head further up the ramp surface towards the second end of the ramp in order to unlatch the actuator arm.

* * * * *